R. REIN.
CALCULATING MACHINE.
APPLICATION FILED JULY 19, 1909.

947,188.

Patented Jan. 18, 1910.

Witnesses:

Inventor:
Robert Rein,
by
Attorneys.

UNITED STATES PATENT OFFICE.

ROBERT REIN, OF BERLIN, GERMANY.

CALCULATING-MACHINE.

947,188.  Specification of Letters Patent.  Patented Jan. 18, 1910.

Application filed July 19, 1909. Serial No. 508,496.

*To all whom it may concern:*

Be it known that I, ROBERT REIN, a subject of the Emperor of Germany, and resident of Berlin, Germany, have invented a certain new and useful Improvement in Calculating-Machines, of which the following is a specification.

This invention relates to improvements in calculating machines of the type described in British patents Nos. 13504 of 1851 and 26296 of 1906 and has for its object improvements in the mounting of decimal indices for such machines.

In order to adjust decimal indices corresponding to the number of places for calculating machines of the kind above mentioned in most cases separate holes were provided in the index plates in which the decimal index could be inserted. In order in fast calculating to avoid the necessity for troublesome insertion of the decimal index in a hole it has been attempted to mount the decimal index movably by various arrangements for example by cross pins secured to the index plates, bands or the like.

The subject of the present application is a novel mounting of the decimal index in which the decimal index is movably mounted longitudinally of the whole index plate without having special cross bars, rails and the like secured to the index plate.

The essential feature of the new arrangement consists in this that in the index plate itself are arranged one or more longitudinal slits of suitable transverse section in which the decimal index provided with corresponding projections is movably mounted. This novel arrangement is illustrated by way of example in the accompanying drawing in which—

Figure 1:
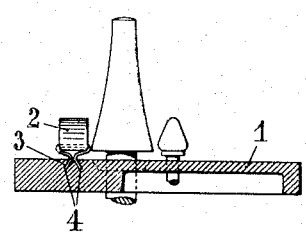
Figure 2:
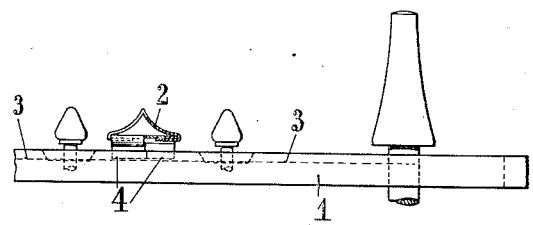
Figure 3:
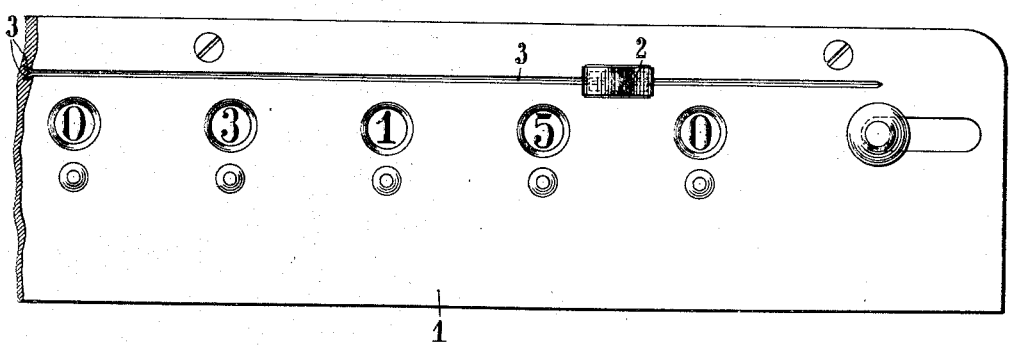

Figure 1 is a transverse section through an index plate. Fig. 2 an end elevation and Fig. 3 is a plan of the same.

Referring to the drawing 1 is the index plate, 2 the decimal index which is movably mounted on the index plate. In order to avoid having a cross bar, rail or tube for moving the decimal point on the index plate, longitudinal slits 3 may be arranged in the same by way of example inclined at an angle to the plane of the index plate and to each other. The decimal index engages in this longitudinal slit 3 by means of tongues 4 so that it can be moved along the slit 3 but cannot be raised vertically out of the slits 3.

For the purposes of the simple adjustment of the decimal index it can be bent from sheet metal. Instead of plane slits inclined at an acute angle to the plane of the index plate, slits of suitable cross section inclined at any other angle could be arranged with the same effect.

What I claim as my invention, and desire to secure by Letters Patent is:—

1. Means for decimal indexing in calculating machines comprising, in combination, an index plate provided with two longitudinal slits inclined to the surface thereof and arranged in cross section substantially at right angles to one another, and an index having two corresponding projections adapted to enter said slits, substantially as and for the purpose set forth.

2. Means for decimal indexing in calculating machines comprising, in combination, an index plate provided with a plurality of angularly disposed longitudinal slits, an index formed from sheet metal, and a plurality of resilient tongues on said index adapted to enter said slits, substantially as and for the purpose set forth.

In testimony whereof I have signed my name to this specification in the presence of two subscribing witnesses.

ROBERT REIN.

Witnesses:
 HENRY HASPER,
 WOLDEMAR HAUPT.